Figure 1:
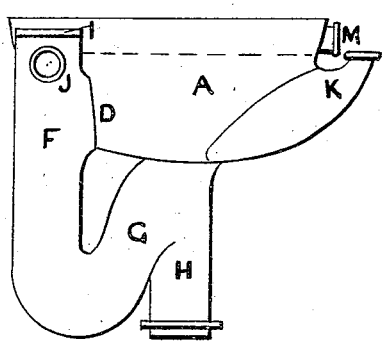

(No Model.)

D. T. BOSTEL.
WATER CLOSET.

No. 253,151. Patented Jan. 31, 1882.

WITNESSES
Fred Hayner
Ed Glatzmayer

INVENTOR
Daniel Thomas Bostel
by his attorneys
Brown & Brown

UNITED STATES PATENT OFFICE.

DANIEL T. BOSTEL, OF BRIGHTON, COUNTY OF SUSSEX, ENGLAND, ASSIGNOR TO HENRY C. MEYER AND SAMUEL F. SNIFFEN, OF NEW YORK, AND FREDERICK R. SMART, OF BAY SIDE, N. Y.

WATER-CLOSET.

SPECIFICATION forming part of Letters Patent No. 253,151, dated January 31, 1882.

Application filed May 23, 1881. (No model.) Patented in England October 11, 1880.

*To all whom it may concern:*

Be it known that I, DANIEL THOMAS BOSTEL, of Brighton, in the county of Sussex, England, have invented certain new and useful Improvements in Water-Closets, (for which I have obtained Letters Patent in Great Britain, bearing date October 11, 1880, No. 4,126;) and I do hereby declare that the following is a full, clear, and exact description thereof, reference being had to the accompanying drawings, making part of this application.

My invention relates to that class of water-closet apparatus known as "side delivery," in which is employed, first, a bowl or basin the bottom of which is curved so as to always hold a certain quantity of water, into which the soil passes on usage of the closet; second, an outlet-pipe or source of exit from the bowl, situated at the front of the closet and communicating with a trap or water-seal beneath; and, third, inlet-nozzles or supply-pipes located at the rear of the basin, one for the purpose of discharging a stream of water into the water contained in the dish-shaped pan, and thereby forcing the contents of said pan into the outlet-pipe, through the trap, and thence down the soil-pipe into the sewer, and the other of said inlet-nozzles adapted to discharge at the same time a stream of water into the flushing-rim, which is open or perforated at its under side, so as to allow the water to descend and wash the interior walls of the basin or bowl. By the placement of the outlet-pipe of the pan or receiver at the front of the water-closet (in contradistinction to locating it at the rear or wall side of the closet, as shown, for instance, in my English Letters Patent No. 1,412, of April 11, 1877) a decided advantage is gained, inasmuch as a readier access to the interior thereof may be obtained and the same cleaned with greater facility; but in water-closets of this kind as heretofore made the exit or outlet pipe has consisted of a short piece of pipe, of irregular shape, formed integral with and located directly underneath both a portion of the overhanging flushing-rim and part of the soil receptacle or pan, and has had its lowermost end jointed to the upper leg of an ordinary trap or water-seal. A good example of this kind of closet is shown in English Letters Patent No. 4,424, of November 15, 1876. A water-closet so constructed, although having the outlet-pipe from the pan situated at the front of the bowl, and being more convenient to get at than one located at the wall side of the closet, is nevertheless objectionable, for the reason that considerable difficulty is experienced in cleaning out the trunk and trap portions thereof, in consequence of a portion of both the flushing-rim and the pan or receiver projecting over and so abridging the entrance to the irregularly-shaped pipe or outlet as to prevent the insertion and use of a plunger or piston, fitting the bore of the pipe, to force or pump out any obstructions therein contained.

My invention has for its main object the production of a water-closet in which the outlet-pipe or trunk is so constructed and situated relatively to the bowl as to be not only most convenient of access but at the same time to permit without hinderance the use of a piston or plunger to force out whatever refuse or stuff there may be clogged in the trunk or trap; and to this main end and object my invention consists, first, in locating the trunk or outlet-pipe at one side of the front of the bowl, isolated from the flushing rim and pan thereof, whereby greater facility is afforded for cleaning both the trunk and trap of any obstructions which may be lodged therein; and my invention further consists in combining with the isolated trunk and the pan or receiver of the closet an intermediate lateral channel or passage-way, for the purpose hereinafter explained.

Figure 2:
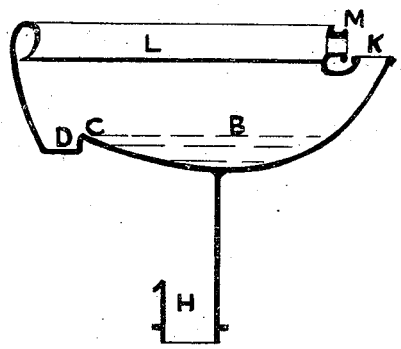
Figure 3:
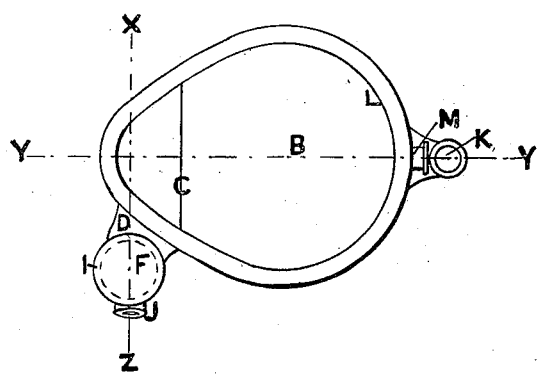
Figure 4:
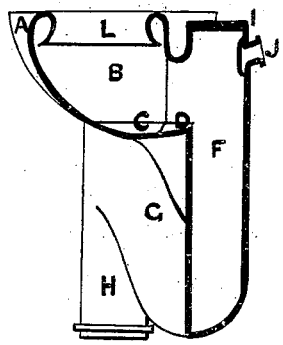

In the accompanying drawings, Figure 1 is a side elevation of a water-closet constructed according to my invention. Fig. 2 is a vertical section of the same, taken at the line $y\,y$ of Fig. 3. Fig. 3 is a top or plan view, and Fig. 4 is a vertical section taken at the line $x\,z$ of Fig. 3.

In the several figures the same parts will be found designated by the same letter of reference.

A represents the complete closet, which, by preference, is formed of one piece of china or earthen ware.

B is the bowl or basin thereof made curved or dish-shaped at its bottom, adapted and designed to contain always a quantity of water therein. Its forward end communicates with a short depressed lateral channel, D, which in turn leads to a vertical trunk or outlet-pipe, F, by preference formed together with the trap and exit portions G H.

Surrounding the bowl or basin B at its upper edge is a flushing-rim, L, provided at its side with a pipe or nozzle, M, which communicates with a tank or supply-cistern overhead. (Not shown in the drawings.)

The pan or soil-receiving portion of the bowl B curves upward gradually at its rear end, and has fitted thereto a nozzle or spout, K, which in practice is connected to the pipe leading from the supply-tank above.

The trunk F, as shown, is located at either side of the front of the water-closet bowl, (so as to be out of the way of both the flushing-rim and pan portion of the bowl,) at which place it is most convenient of access. The said trunk or chamber is, by preference, formed integral with the trap portion G, and extends upward to nearly a level with the wooden seat of the closet, and is there provided with a removable cover, I, as shown, just below which cover is formed in the trunk a socket, J, to which may be attached an overflow-pipe, and to the latter may be connected a ventilator-shaft communicating with the open air.

To clear the trap and trunk, or either of them, when clogged up, it will be seen that the construction as well as the location of the trunk are such that upon the removal of the cover I a piston or plunger fixed to a suitable handle or rod may be readily inserted and most conveniently and efficiently worked within the trunk to force or pump out and clear away such obstructing matter.

The short side channel or water-way D is, by preference, formed integral with the bowl B and trunk F, and serves to conduct the excrement and flushing-water from the bowl to the trunk or shaft F.

The general operation of the apparatus is as follows: After use of the closet the occupant, as is customary, lets on the supply of water from the tank overhead, which simultaneously enters the flushing-rim at M and the pan portion of the bowl at K, the water entering at M circulating around the hollow rim and discharging at its under side, washing down the interior walls of the bowl and meeting in the pan and channel-way the flush which enters at K. Said flush, entering at K, rushes down the curved sides of the bowl from the rear to the soil-receptacle, carrying its contents forward over the lip or ledge C thereof down on to the lateral channel D, thence sidewise into and through the trunk F, up the trap G, and out the exit-pipe H, to the sewer-connections.

Having now so fully described my invention that those skilled in the art can make and use a water-closet apparatus embodying the same, what I claim as new, and desire to secure by Letters Patent, is—

1. In a water-closet apparatus, a trunk or exit-pipe located at one side of the bowl or basin and at its front, for the purposes set forth.

2. In a side-delivery water-closet, the combination, with the bowl and the outlet-trunk, of an intermediate channel or water way, D, substantially as and for the purpose set forth.

DANIEL THOMAS BOSTEL.

Witnesses:
E. GARDNER COLTON,
F. DESVEUX.